United States Patent [19]

Abe et al.

[11] Patent Number: 4,771,535
[45] Date of Patent: Sep. 20, 1988

[54] DISK INSERTION APPARATUS FOR INSERTING A DISK INTO A RIM ELEMENT OF A DISK WHEEL

[75] Inventors: Kishiro Abe, Ayase; Yusaku Shinozawa, Tokyo; Hiroshi Yamada, Fukuoka, all of Japan

[73] Assignees: Topy Kogyo Kabushiki Kaisha, Tokyo; Watanabe Tekko Kabushiki Kaisha, Fukuoka, both of Japan

[21] Appl. No.: 110,794

[22] Filed: Oct. 21, 1987

[51] Int. Cl.⁴ .............................................. B23P 19/04
[52] U.S. Cl. .................................. 29/802; 29/159.01; 29/525
[58] Field of Search ..................... 29/801, 159.01, 525, 29/446

[56] References Cited

U.S. PATENT DOCUMENTS

| | | | |
|---|---|---|---|
| 1,784,445 | 12/1930 | Hughes | 29/159.01 |
| 4,106,172 | 8/1978 | Bache | 29/159.01 |
| 4,378,623 | 4/1983 | Zimmermann | 29/802 |

Primary Examiner—P. W. Echols
Attorney, Agent, or Firm—Cushman, Darby & Cushman

[57] ABSTRACT

A disk insertion apparatus for inserting a disk into a rim element of a disk wheel. The disk insertion apparatus includes a first disk inserting machine for preliminarily inserting a disk into a rim element and a second disk inserting machine for completing the insertion of the disk into the rim element to a predetermined, final position. The second disk inserting machine is mounted downstream of the first disk inserting machine along the rim flow lines.

15 Claims, 5 Drawing Sheets

DISK INSERTION APPARATUS FOR INSERTING A DISK INTO A RIM ELEMENT OF A DISK WHEEL

BACKGROUND OF THE INVENTION

1. Field of the Invention

The present invention relates to a disk insertion apparatus for inserting a disk into a rim element of a disk wheel.

2. Description of the Related Art

Vehicle wheels are conventionally manufactured on a wheel manufacture line by the following series of steps: First, a long plate of predetermined width is cut to a specified length and rolled to form a tube. The end portions of the rolled plate are then butt welded together to form a one piece cylindrical element. The cylindrical element is conveyed to a flaring apparatus where both end portions of the cylindrical element are flared by inserting die members into the cylindrical element from either side thereof. The flared element is then conveyed to a rim forming apparatus which typically comprises a plurality of rim forming machines arranged in series where each flared element is press formed to produce a desired rim configuration. The rim element is subsequently conveyed to a disk insertion apparatus where a disk which has been formed on another manufacture line is inserted into the rim element. The formed rim element together with the disk are then conveyed to a welding machine where they are welded together to form a disk wheel. The disk wheel is ultimately painted.

Disks are conventionally inserted into rim elements by the following series of steps: First, a disk is placed in a rim element by hand so that a specific positional relationship exists between a bolt hole formed in the disk and a valve hole formed in the rim element. The disk is then urged into a final, predetermined position by a single press operation of the disk inserting apparatus.

When only a single press operation is employed, however, the operating speed of the apparatus must be slow, because good quality insertion can not be obtained with high speed pressing operations. As a result, the above disk insertion method and apparatus has limited the efficiency of the entire disk wheel manufacture line.

SUMMARY OF THE INVENTION

An object of the present invention is to provide a disk insertion apparatus which can improve the manufacture efficiency of a disk wheel manufacture line.

The foregoing object can be attained, according to the present invention, by a disk insertion apparatus, provided along a disk wheel manufacture line, for inserting a disk into a rim element of a disk wheel, which comprises (a) a first disk inserting machine for preliminarily inserting a disk into a rim element, and (b) a second disk inserting machine, provided downstream of the first disk inserting machine in the disk wheel manufacture line, for completing the insertion of the disk so that it is disposed in a predetermined position within the rim element.

Thus, the disk insertion operation is divided into two sub-operations, insertion by the first disk inserting machine and insertion by the second disk inserting machine. Since the preliminary insertion by the first disk inserting machine does not require great accuracy, the insertion speed of the first disk inserting machine can be high. Also, the low speed insertion stroke of the second inserting machine can be shorter because of the preliminary insertion by the first disk inserting machine. Thus, the insertion time of the second disk inserting machine will be shorter and the manufacture efficiency of the disk wheel can be improved.

BRIEF DESCRIPTION OF THE DRAWINGS

These and other objects and advantages of the invention will become more apparent and can be more readily appreciated from the following detailed description of the presently preferred exemplary embodiment of the invention taken in conjunction with the accompanying drawings, in which.

DETAILED DESCRIPTION OF THE PREFERRED EMBODIMENT

Figure 1:
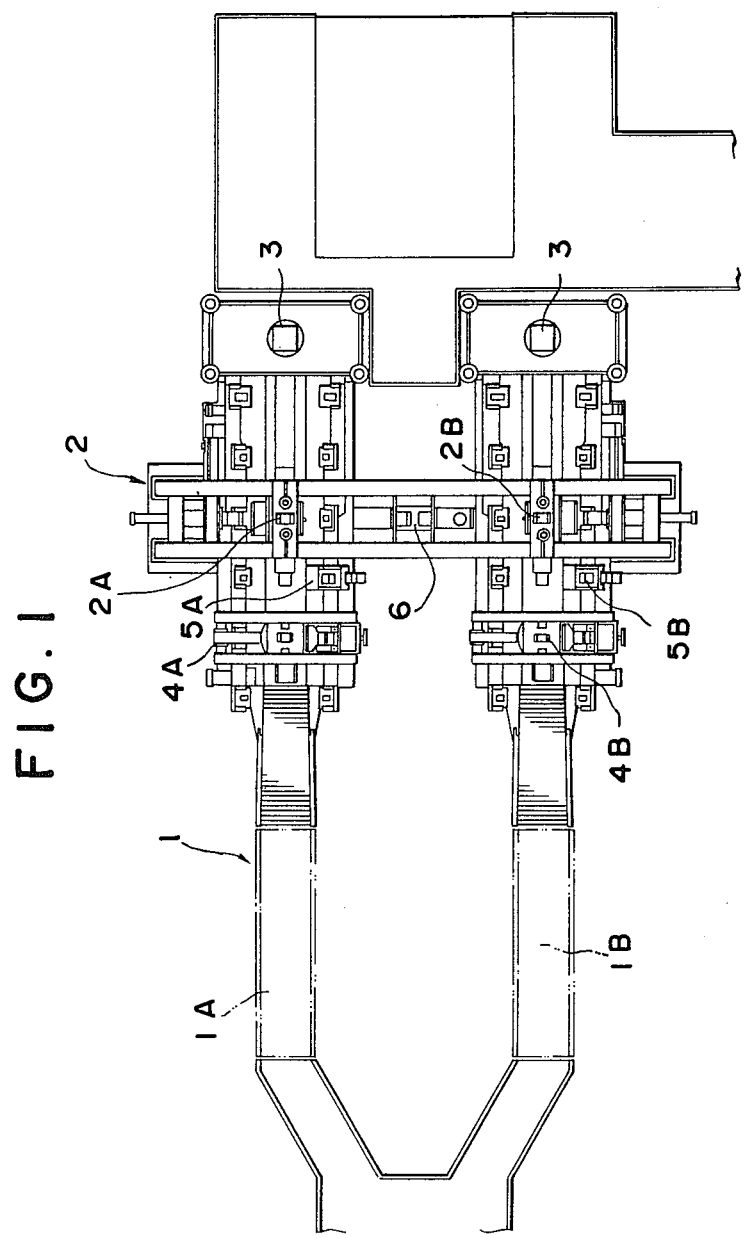
FIG. 1 is a plan view of a disk insertion apparatus according to one embodiment of the present invention.
Figure 2:
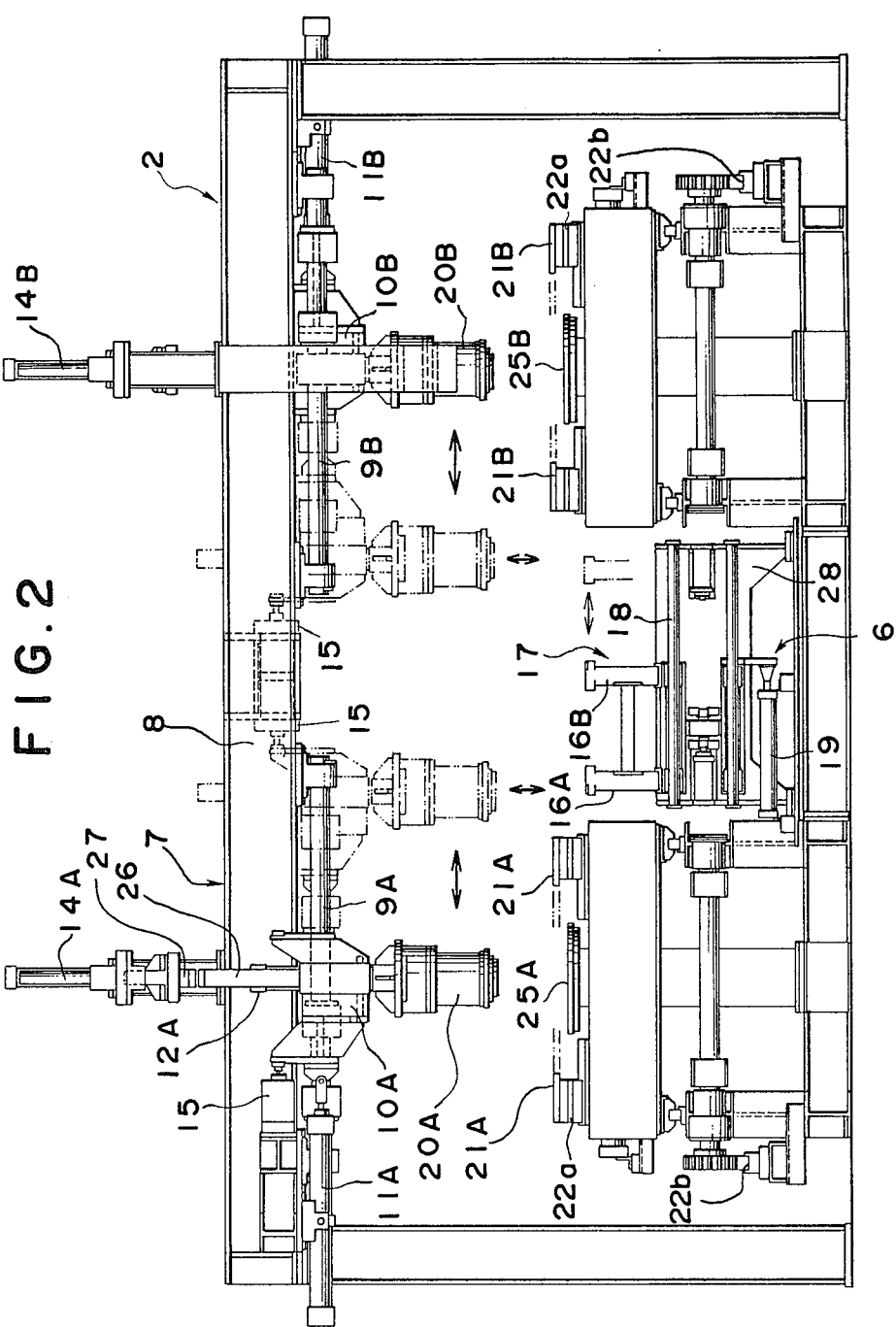
FIG. 2 is a side view of the apparatus of FIG. 1.
Figure 3:
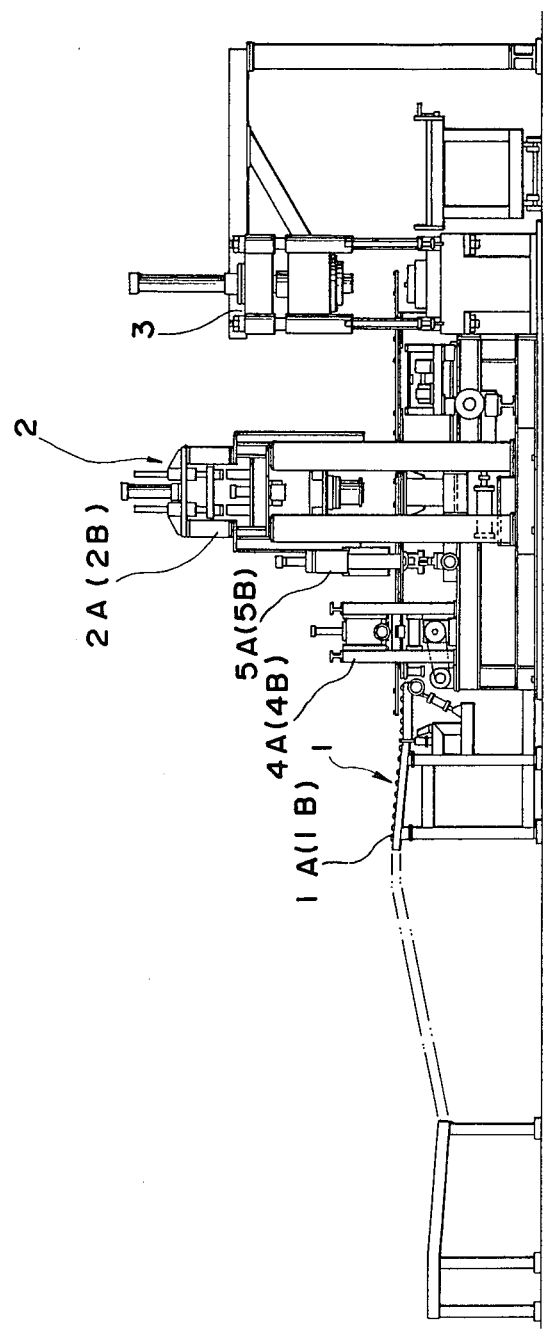
FIG. 3 is a transverse elevational view of a first disk inserting machine of the disk insertion apparatus of FIG. 1.

Referring to FIGS. 1 and 2, a disk insertion apparatus for inserting a disk into a rim element of a disk wheel is provided along a disk wheel manufacturing line between a rim forming apparatus (not shown) and a welding machine (not shown) for welding the disk and the rim element together. Valve hole detecting apparatuses 4A and 4B and valve hole coining apparatuses 5A and 5B are mounted upstream of the disk insertion apparatus. The manufacturing line along which the disk insertion apparatus is mounted may include a single rim flow line or several rim flow lines 1. FIG. 1 shows an embodiment wherein the disk insertion apparatus is provided for two rim flow lines 1A and 1B which are arranged in parallel.

The disk insertion apparatus generally comprises a first disk inserting machine 2 for preliminarily inserting a disk into a rim element and a second disk inserting machine 3 for completing the insertion of the disk so that it will be disposed in a predetermined position within the rim element. First disk inserting machine 2 extends in a transverse direction with respect to rim flow lines 1. Second disk inserting machine 3 is provided downstream of first disk inserting machine 2. The disk insertion apparatus may further include a disk feeder 6 adjacent first disk inserting machine 2 for feeding a disk to the same, as described more fully below.

When first inserting machine 2 is used along a manufacturing line having two rim flow lines 1A and 1B, it includes two first inserting devices 2A and 2B which are substantially symmetrical to each other as shown in FIGS. 1 and 2. As shown in FIG. 2, a frame 7 is provided which includes a beam 8 extending in the transverse direction with respect to rim flow lines 1A and 1B. Left and right guides 9A and 9B are supported by frame 7 and extend horizontally therealong. Left and right supporters 10A and 10B are in turn slidably supported by guides 9A and 9B, respectively. As shown in detail in FIG. 4, lower guide shafts 26 which extend in a vertical direction are slidably supported by left and right supporters 10A and 10B so as to move vertically. Left and right first heads 20A and 20B are suspended by lower guide shafts 26 so as to move together with lower guide shafts 26. Left and right vertically transporting cylinders 12A and 12B for transporting first heads 20A and 20B in the vertical direction are provided between supporters 10A and 10B and first heads 20A and 20B, respectively.

As shown in FIG. 2, left and right transversely transporting cylinders 11A and 11B for transporting supporters 10A and 10B in the transverse direction are provided between frame 7 and supporters 10A and 10B. Members 15 fixed to frame 7 are transverse stoppers and also function as cushions. Preferably, cylinders 11A and 11B and cylinders 12A and 12B are air cylinders so that high speed driving is possible.

Figure 4:
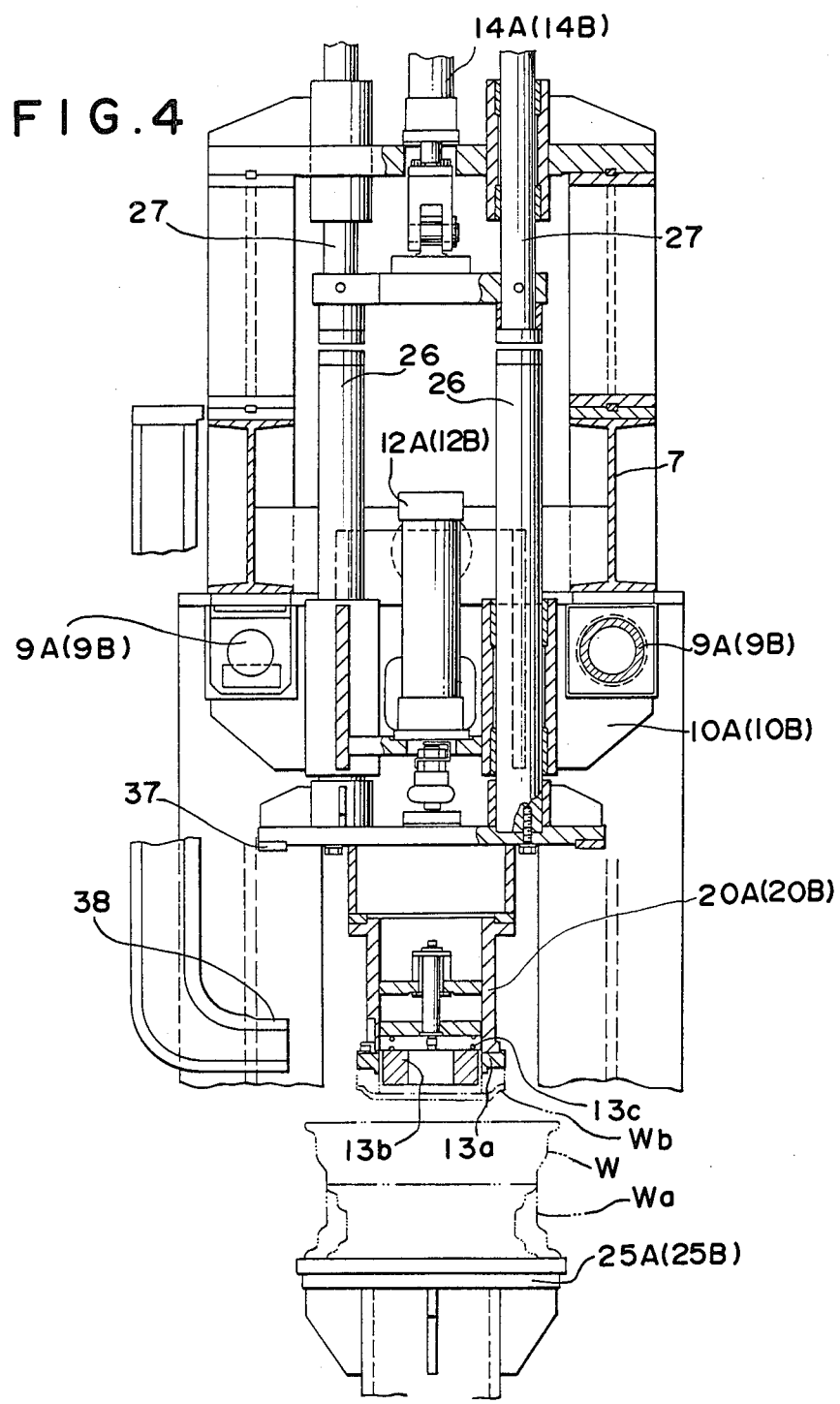
FIG. 4 is a partial enlarged elevational view of the first disk inserting machine of FIG. 3.

As shown in FIG. 4, upper guide shafts 27 which extend in the vertical direction are slidably supported by frame 7. Upper guide shafts 27 are provided above rim flow lines 1A and 1B and can not be moved transversely, whereas lower guide shafts 26 can move in the transverse direction. Left and right vertically driving cylinders 14A and 14B are mounted on frame 7 and connected to upper guide shafts 27. Left and right vertically driving cylinders 14A and 14B vertically drive first heads 20A and 20B via upper and lower guide shafts 27 and 26 so that first heads 20A and 20B preliminarily insert a disk Wb into a rim element Wa, when first heads 20A and 20B are brought to positions below cylinders 14A and 14B, respectively. Preferably, driving cylinders 14A and 14B are hydraulic cylinders each having high and low speeds. When driving cylinders 14A and 14B are operated, first heads 20A and 20B are lowered at the low speed first to the position in the vicinity of the rim element and then are lowered at the high speed to preliminarily insert the disk into the rim element.

As shown in FIG. 4, left and right first heads 20A and 20B each include an annular pushing member 13a for pushing disk Wb into rim element Wa of a disk wheel W, an electrically operated magnet 13b mounted inside pushing member 13a so as to move axially with respect to pushing member 13a, and a spring 13c, mounted inside pushing member 13a for receding magnet 13b from disk Wb when magnet 13b receives a reaction force from disk Wb during insertion of the same into rim element Wa.

First heads 20A and 20B and frame 7 are provided with stoppers 37 and 38 for determining a preliminary insertion position of the disk in the rim element. The preliminary insertion position is located above the predetermined insertion position to which the disk is pushed by the second inserting machine 3.

When first disk inserting machine 2 is used in a manufacturing line having a single rim flow line, it is simply a single disk inserting device 2A or 2B.

As shown in FIG. 2, disk feeder 6 is provided between first disk inserting devices 2A and 2B. Disk feeder 6 includes a feeder frame 28, a feeder guide 18 supported by feeder frame 28 and extending horizontally in the transverse direction, a shuttle 17 slidably guided by feeder guide 18 so as to move therealong, and a shuttle drive cylinder 19, mounted between feeder frame 28 and shuttle 17, for driving shuttle 17 in the transverse direction. Shuttle 17 has two columns 16A and 16B which extend upward and are adapted to receive thereon a disk to be fed.

Shuttle drive cylinder 19 drives shuttle 17 so that columns 16A and 16B move transversely between the center of disk feeder 6 and one stroke end adjacent rim flow line 1A corresponding to a transverse stroke end of first head 20A and another stroke end adjacent rim flow line 2B corresponding to a transverse stroke end of first head 20B. Stoppers 15 determine the transverse stroke ends of first heads 20A and 20B and also functions as cushions.

Figure 5:
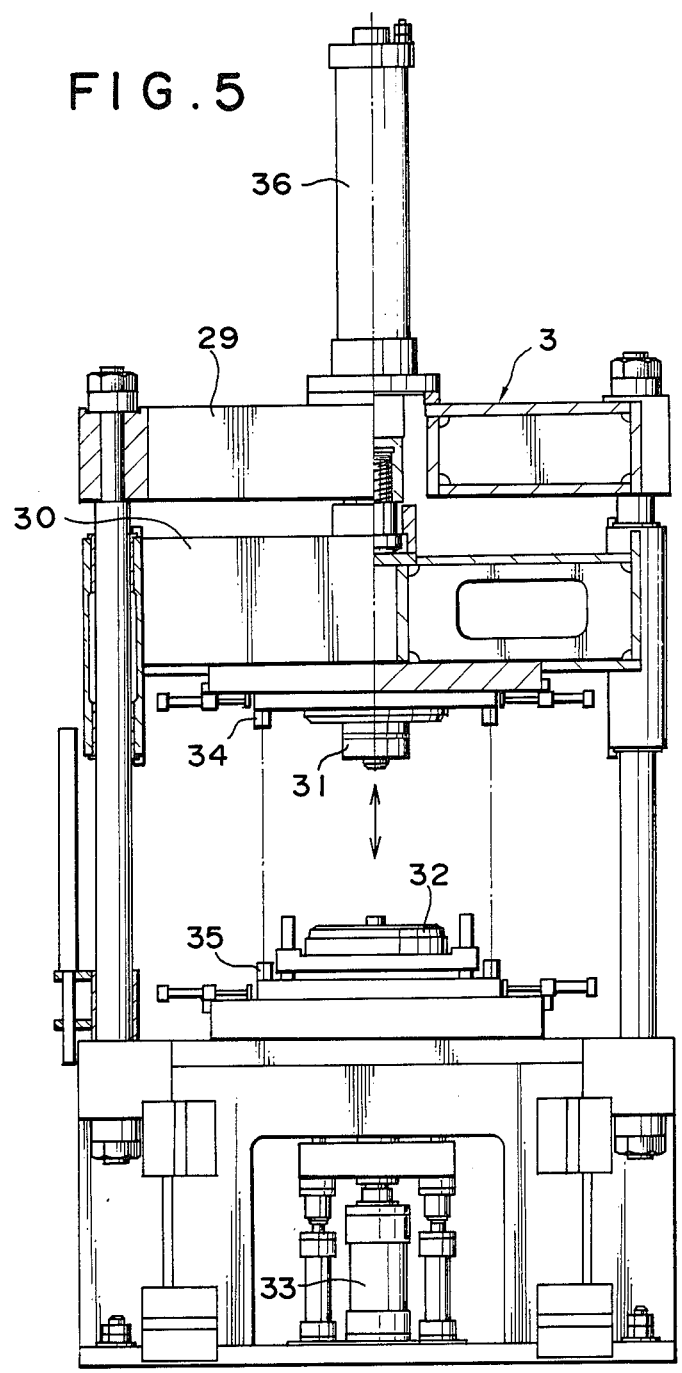
FIG. 5 is an elevational view of a second disk inserting machine of the disk insertion apparatus of FIG. 1.

Second disk inserting machine 3 is mounted to each rim flow line 1A and 1B, as shown in FIG. 1. Referring to FIG. 5, second disk inserting machine 3 includes a fixed frame 29 and a movable frame 30 supported by fixed frame 29 so as to move in a vertical direction. A second head 31 is supported by movable frame 30 so as to move vertically therewith. A work support 32 onto which rim element Wa with disk Wb is conveyed is provided beneath second head 31. A cylinder 33 is connected to work support 32 to act as a cushion when disk Wb is pushed by second head 31 to the predetermined position within rim element Wa. First and second stoppers 34 and 35 are mounted to movable frame 30 and fixed frame 29, respectively, and determine the predetermined position of disk Wb. Vertically driving cylinder 36 is provided between fixed frame 29 and movable frame 30 and drives movable frame 30 together with second head 31 vertically to push disk Wb into rim element Wa.

Next, operation of the disk insertion apparatus will be explained.

Rim elements conveyed on rim flow lines 1A and 1B are gripped by grippers 21A and 21B from either side thereof and are brought to tables 25A and 25B beneath cylinders 14A and 14B by operating transfer mechanisms 22a including rack and pinion mechanisms 22b. Disks to be inserted into the rim elements are fed to first disk inserting machine 2 by disk feeder 6. Shuttle 17 alternately delivers disks to first disk inserting devices 2A and 2B. More particularly, the disks mounted on columns 16A and 16B of disk feeder 6 are raised by magnets 13b of first heads 20A and 20B and are transported to positions above the rim elements by operating cylinders 12A and 12B and cylinders 11A and 11B so as to move first heads 20A and 20B. Then, driving cylinders 14A and 14B are operated to drive first heads 20A and 20B downwardly. As noted above, cylinders 14A and 14B preferably each have two operating speeds. Thus, first heads 20A and 20B can be driven at high speed so that first heads 20A and 20B can approach the work W quickly and, then, heads 20A and 20B can be driven at low speed so that good quality insertion of disk Wb into rim element Wa is possible. First heads 20A and 20B insert disk Wb into rim element Wa to a preliminary position which is determined by stoppers 37 and 38. The insertion operation of first disk inserting devices 2A and 2B are performed alternately according to the alternate operation of shuttle 17. Then, first heads 2A and 2B are raised and the transfer mechanisms including rack and pinion mechanisms transfer the rim element with the disk toward second disk inserting machine 3. The raised first heads 20A and 20B are then moved toward disk feeder 6 so that another disk can be picked up and the process is repeated.

The rim element with the disk is conveyed to work support 32 of second disk inserting machine 3. Driving cylinder 36 is then operated so as to drive second head 31 downwardly. Preferably, driving cylinder 36 is capable of high speed and low speed operation. First, driving cylinder 36 is driven at a high speed so that second head 31 approaches work W and then driving cylinder 36 is driven at a low speed so that disk Wb can be properly pushed into rim element Wa. Second head 31 inserts disk Wb to a predetermined position which is defined by stoppers 34 and 35. Then, second head 31 is raised by operating cylinder 36 and the combination of rim element Wa and disk Wb is conveyed to the next station where they are welded together.

As is apparent from the foregoing, since disk insertion is performed in two automated steps, that is, a preliminary disk insertion step performed by a first disk inserting machine and a final disk insertion step performed by a second disk inserting machine, the time required to insert a disk into a rim element can be decreased to about one half the disk insertion time which has been heretofore required with conventional disk insertion apparatuses having only one automated insertion step. Further, since the insertion by the first disk inserting machine need not be particularly good quality because of the good quality insertion obtained by the second disk inserting machine, the disk insertion time can be further decreased. Furthermore, by using cylinders having two speeds as in the preferred embodiment, the disk insertion time can be further decreased.

Even further where the disk insertion apparatus is used in a manufacturing line having two rim flow lines, disk feeding to the first disk insertion machine can be performed by a single shuttle mounted on the disk feeder. This minimizes the cost of the apparatus and means that one worker can control disk supply to disk feeder and hence to both rim flow lines. Since the transport of the disk from disk feeder to the rim flow lines is performed by cylinders that are distinct from the driving cylinders, and since a high speed cylinder can be used for such cylinders, transportation of the disk can be performed smoothly and without affecting the time of disk insertion.

Although only one embodiment of the present invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and the scope of the present invention as defined by the following claims.

What is claimed is:

1. A disk insertion apparatus, mounted along a disk wheel manufacturing line, for inserting a disk into a rim element of a disk wheel, comprising:
    first disk inserting means mounted along the manufacturing line for preliminarily inserting a disk into a rim element being conveyed along the manufacturing line; and
    second disk inserting means mounted downstream of said first disk inserting means along said manufacturing line, for completing the insertion of said disk so that it is disposed in a predetermined position within said rim element.

2. The disk insertion apparatus according to claim 1, further comprising disk feeder means, mounted adjacent said first disk inserting means, for feeding disks to said first disk inserting means.

3. The disk insertion apparatus according to claim 1, mounted to a manufacturing line having a single rim flow line.

4. The disk insertion apparatus according to claim 1, mounted to a manufacturing line having a plurality of rim flow lines, arranged in parallel.

5. The disk insertion apparatus according to claim 1, wherein said second disk inserting means comprises:
    a fixed frame;
    a movable frame supported by said fixed frame so as to move in a vertical direction;
    a second head element supported by said movable frame;
    a work support mounted beneath said second head element;
    a cylinder connected to said work support; and
    vertical drive means, mounted between said fixed and movable frames, for vertically driving said movable frame.

6. The disk insertion apparatus according to claim 5, wherein said movable frame and said fixed frame include stoppers for determining a predetermined final insertion position of said disk.

7. The disk insertion apparatus according to claim 5, wherein said vertical drive means comprises a cylinder having two operating speeds.

8. A disk insertion apparatus, mounted along a disk wheel manufacturing line, for inserting a disk into a rim element of a disk wheel, comprising:
    first and second rim flow lines mounted in parallel to one another;
    first disk inserting means mounted along the manufacturing line so as to extend in a transverse direction with respect to said rim flow lines, for preliminarily inserting a disk into a rim element being conveyed along the manufacturing line;
    second disk inserting means mounted downstream of said first disk inserting means to each of said rim flow lines, for completing the insertion of said disk so that it is disposed in a predetermined position within said rim element; and
    disk feeder means mounted to said first disk inserting means, for feeding disks to said first disk inserting means.

9. The disk insertion apparatus according to claim 8, wherein said first disk inserting means comprises:
    a frame extending in the transverse direction with respect to said rim flow lines;
    two first head elements supported by said frame so as to move vertically and transversely relative to and between said disk feeder and said rim flow lines;
    transverse transport means, mounted between said frame and said first head elements, for transversely transporting said first head elements;
    vertical transport means, mounted between said frame and said first head elements, for vertically transporting said first head elements; and
    vertical drive means, mounted on said frame, above said rim flow lines, for vertically driving said first head elements so that said first head elements can preliminarily insert a disk into a rim element.

10. The disk insertion apparatus according to claim 9, wherein said vertical drive means comprise a cylinders having two operating speeds.

11. The disk insertion apparatus according to claim 9, wherein each of said first head elements comprises:
    annular pushing means for pushing the disk into the rim element;
    an electrically operated magnet mounted within said pushing member; and
    spring means, mounted within said pushing member, for receding said magnet from said disk when said magnet receives a reaction force from said disk during insertion of said disk into said rim element.

12. The disk insertion apparatus according to claim 8, wherein said first disk inserting means comprises:
- a frame extending in the transverse direction with respect to said rim flow lines;
- left and right guides supported by said frame and extending horizontally along said frame;
- left and right supporters slidably supported by said guides;
- lower guide shafts slidably supported by said left and right supporters and extending in a vertical direction;
- left and right first head elements suspended by said lower guide shafts;
- left and right vertical transport cylinders, mounted between said supporters and said first head elements, for vertically transporting said first head elements;
- left and right transverse transport cylinders, mounted between said frame and said supporters, for transversely transporting said supporters;
- upper guide shafts slidably supported by said frame and extending vertically above said rim flow lines; and
- left and right vertical drive cylinders, mounted on said frame and connected to said upper guide shafts, for vertically driving said first head elements via said upper and lower guide shafts so that said first head elements can preliminarily insert a disk into a rim element.

13. The disk insertion apparatus according to claim 12, wherein said first head elements and said frame include stoppers for determining a preliminary insertion position of said disk.

14. The disk insertion apparatus according to claim 8, wherein said disk feeder means comprises:
- a feeder frame;
- a feeder guide supported by said feeder frame and extending horizontally in the transverse direction with respect to said rim flow lines;
- a shuttle slidably guided by said feeder guide so as to move along said feeder guide and including two upwardly extending columns; and
- shuttle drive means, mounted between said feeder frame and said shuttle, for transversely driving said shuttle.

15. The disk insertion apparatus according to claim 13, wherein said shuttle drive means drives said shuttle so that each of said columns of said shuttle moves in the transverse direction between a center of said disk feeder and first and second stroke ends adjacent each said rim flow line, respectively, corresponding to a transverse stroke end of each said first head element, respectively.

* * * * *